United States Patent [19]
Boileau

[11] 3,831,654
[45] Aug. 27, 1974

[54] TIRE HAVING LATERAL SHIFT OF SALIENT TREAD GROOVE ANGLES

[75] Inventor: Jacques Boileau, Clermont-Ferrand, France

[73] Assignee: Compagnie Generale des Establissements Michelin, raison sociale Michelin & Cie, Clermont-Ferrand, France

[22] Filed: Feb. 12, 1973

[21] Appl. No.: 331,987

[30] Foreign Application Priority Data
Feb. 25, 1972 France ............................. 72.6965

[52] U.S. Cl. .............................................. 152/209
[51] Int. Cl. ............................................. B60c 11/06
[58] Field of Search ................................. 152/209

[56] References Cited
UNITED STATES PATENTS
3,550,665  12/1970  Verdier ........................ 152/209
3,584,670  6/1971  Verdier ........................ 152/209
3,664,402  5/1972  Montagne ..................... 152/209

Primary Examiner—Robert J. Spar
Assistant Examiner—Kenneth Noland
Attorney, Agent, or Firm—Brumbaugh, Graves, Donohue & Raymond

[57] ABSTRACT

A radial tire for heavy road vehicles comprises a tread formed with wide circumferential zigzag grooves. The sides of the grooves form angles that are alternately salient and reentrant, and the zigzag of at least one of the grooves has its amplitude reduced by a lateral shift of the salient angles along at least one side of the groove. The shift is one of translation without rotation.

6 Claims, 5 Drawing Figures

TIRE HAVING LATERAL SHIFT OF SALIENT TREAD GROOVE ANGLES

BACKGROUND OF THE INVENTION

This invention relates to tires and, more particularly, to radial tires that are intended for use on heavy highway vehicles and that have novel and highly effective treads, either new or recapped.

Radial tires for heavy road vehicles are typically provided with a tread formed with a number of circumferential ribs separated by zigzag circumferential grooves. This type of tread pattern has been in use since the very beginning of radial-type tires for heavy vehicles. It has recently been improved in ways disclosed in U.S. Pat. Nos. 3,411,559, 3,550,665, and 3,664,402.

The design of the zigzag path of the circumferential grooves reflects a compromise between contradictory requirements. Good tread wear is promoted by zigzags of small amplitude: that is, by zigzags comprising linear segments that are relatively short or that make a relatively small angle with the circumferential direction. On the other hand, good adherence to the road is promoted by zigzags of rather large amplitude, comprising long segments making a relatively large angle with the circumferential direction.

SUMMARY OF THE INVENTION

An object of the invention is to provide a radial tire for heavy road vehicles that is superior to conventional tires of this type as regards the amount and nature of tread wear, adherence to the road, or both.

The foregoing and other objects are attained according to the invention by the provision of a radial tire that is intended for use on heavy road vehicles and that is provided with a tread formed with a number of circumferential ribs separated by zigzag circumferential grooves. The tire is characterized in that the amplitude of the zigzag of at least one circumferential tread groove is reduced by a parallel shift, towards the inside of the groove, of the salient angles of at least one of the edges of the groove. By a parallel shift or displacement is meant a translation without rotation: i.e., a shift accomplished in such a manner as not to disturb the orientation of the shifted portion of the sides forming the salient angles.

Preferably, each wide zigzag circumferential tread groove has its amplitude reduced by an inward shifting of the salient angles along both sides of the groove.

Preferably also, the length of each shifted portion of sides of the salient angles is between one-fourth and one-half, and preferably close to 40 percent, of the length of one of the segments of the zigzag.

In a preferred embodiment, each groove section has a wide central portion and, on each side of the central portion, a lateral portion which is narrowed, on the salient side, an amount equal to 10 percent to 25 percent of the width of the central portion.

The walls of the grooves preferably are of variable inclination, as disclosed in U.S. Pat. No. 3,664,402. Moreover, it is desirable to provide fine cuts in the tread at the ends of the displaced portions. These improve the mobility of the rib portions protruding into the grooves.

BRIEF DESCRIPTION OF THE DRAWING

A better understanding of the invention can be gained from a consideration of the following detailed description of the preferred embodiments thereof, in conjunction with the appended figures of the drawing, wherein.

DESCRIPTION OF THE PREFERRED EMBODIMENTS

Figure 1:
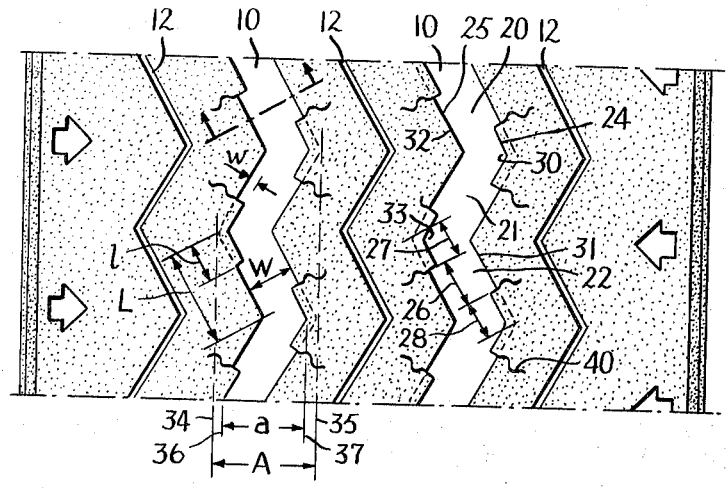
FIG. 1 is a plan view of a sector of the tread of a tire in accordance with the invention.
Figure 2:
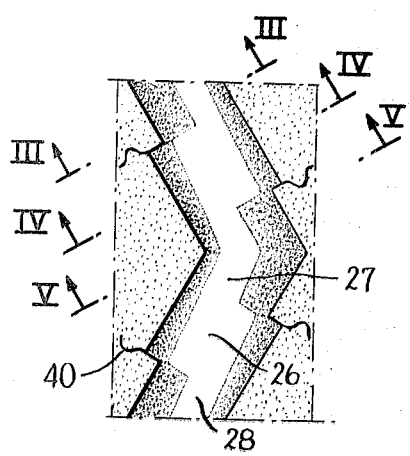
FIG. 2 is a plan view, on a larger scale and in greater detail, of a portion of the tread shown in FIG. 1.

FIG. 1 shows in plan view a portion of the tread 1 of a radial tire of size 11–22.5 for trucks.

The tread 1 is divided by five circumferential zigzag grooves including two wide grooves 10 and three narrow grooves 12. The grooves are formed by segments inclined alternately in one direction and the other, by an angle of 30° with respect to the circumferential direction.

Three successive segments 20, 21, 22 of each wide groove 10 and the edges 24 and 25 defining it form salient and reentrant angles. The groove edge 24 has a salient angle 30 at the intersection of the segments 20 and 21 and a reentrant angle 31 at the intersection of the segments 21 and 22. The opposite occurs in the case of the groove edge 25, which has a reentrant angle 32 at the intersection of the segments 20 and 21 and a salient angle 33 at the intersection of the segments 21 and 22.

In accordance with the invention, the salient groove angles 30 and 33 are subject to a parallel shift or displacement towards the inside of the groove. The drawing shows in dashed outline the positions the salient angles would occupy but for the shift in accordance with the invention. The shift involves a length 1 which is about 40 percent of the length L of the segments 20. This portion of the groove side is shifted a distance w which is close to 17 percent of the width W of the wide section of the segment in question. The amplitude A of the zigzags of the groove 10 defined by the two circumferential lines 34 and 35 is decreased by about 20 percent to become the amplitude a defined by the two circumferential lines 36 and 37. Each groove segment such as 20 comprises a wide central portion 26 and two lateral portions 27 and 28 which are narrowed on the salient side. The central portion 26 occupies slightly less than one-half of the length L of the segment 20 measured parallel to the edges and slightly more than one-half of the surface of said segment.

Figure 3:
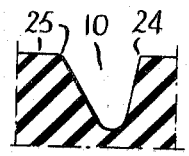
FIGS. 3–5 are radial sections respectively taken along the lines III—III, IV—IV, and V—V of FIG. 2 and looking in the direction of the arrows.
Figure 4:
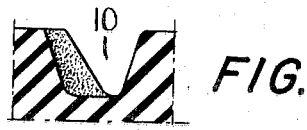
Figure 5:

In accordance with the invention, the shift of the salient angles is preferably combined with a variable inclination of the sides of the grooves. FIGS. 3 to 5 show the cross-section of the groove 10 at different locations. The inclination of each side to the perpendicular to the tread surface decreases along each edge from the salient groove angle to the adjacent reentrant angle and increases from there to the following salient angle.

Preferably, fine cuts 40 are provided originating at the ends of the shifted portions of the salient angles.

The variation in width of the zigzag grooves by a shift of the edges inwardly at the salient angles distinguishes the invention from the prior art. The invention does not involve imparting to the grooves a zigzag outline of alternately large and small amplitude while maintaining the width of the grooves constant, but rather of locally reducing the amplitude and the width of a zigzag groove with constant amplitude.

The embodiments described above are merely exemplary, and those skilled in the art will be able, upon consideration of this disclosure, to make many modifications thereof within the spirit and scope of the invention. The invention is therefore not limited except by the following claims.

I claim:

1. A radial tire for heavy road vehicles, comprising a tread formed with at least one circumferential rib and a plurality of wide circumferential zigzag grooves, the sides of the grooves forming angles that are alternately salient and reentrant and the zigzag of at least one of said grooves having its amplitude reduced by a lateral parallel shift of the salient angles along at least one side of the groove, said shift being one of translation towards the inside of the groove without rotation, the length of each shifted portion of the sides of the salient angles being only a fraction of the length of one of the segments of the zigzag.

2. A radial tire according to claim 1 wherein the zigzag of each of said grooves has its amplitude reduced by lateral shifts of the salient angles along both sides of the groove, said shifts being ones of translation towards the inside of the groove without rotation.

3. A radial tire according to claim 1 wherein the length of each shifted portion of the sides of the salient angles is between one-fourth and one-half of the length of one of the segments of the zigzag.

4. A radial tire according to claim 1 wherein the portions of the grooves narrowed by said lateral shift have a width which is 10 to 25 percent less than the width of the remaining portions of said grooves.

5. A radial tire according to claim 1 wherein each side of each groove has an inclination with respect to the perpendicular to the tread surface that decreases from each salient groove angle to the adjacent reentrant angle and increases from there to the following salient angle.

6. A radial tire according to claim 1 further comprising fine cuts in the treads at the ends of the portions subject to said lateral shift.

* * * * *